May 5, 1959  F. J. O'DELL  2,885,025
MEANS FOR MONITORING THE OPERATION OF A LIQUID FUEL GAUGE
Filed May 14, 1956  2 Sheets-Sheet 1

INVENTOR.
Frank J. O'Dell
BY
*Price and Heneveld*
ATTORNEYS

May 5, 1959  F. J. O'DELL  2,885,025
MEANS FOR MONITORING THE OPERATION OF A LIQUID FUEL GAUGE
Filed May 14, 1956 2 Sheets-Sheet 2

INVENTOR.
Frank J. O'Dell
BY
ATTORNEYS

United States Patent Office 2,885,025
Patented May 5, 1959

2,885,025

MEANS FOR MONITORING THE OPERATION OF A LIQUID FUEL GAUGE

Frank J. O'Dell, Grand Rapids, Mich.

Application May 14, 1956, Serial No. 584,734

12 Claims. (Cl. 183—2.5)

This invention relates to automotive equipment and more particularly to a means for recording the quantity of fuel delivered into the fuel tanks of a truck or other vehicle. This invention is specifically designed to measure liquids only.

This application is a continuation-in-part of my copending application entitled Means for Monitoring the Operation of a Liquid Fuel Gauge, Serial No. 493,355, filed March 10, 1955, now abandoned.

One of the major problems in the trucking industry is to provide a device which will prevent the delivery of a short measure of fuel into the fuel tanks when the truck is fueled at a station other than that owned by the trucking company. Various methods have been devised, even where the trucks have been equipped with metering devices of this type, to induce the metering devices to give a false reading. One of the most common methods is to pass air rather than fuel through the metering device. Particularly is this invention designed to prevent the use of compressed air such as is available at all service stations as a means of operating the meter.

This invention provides a simple and dependable metering device designed to record liquids only. Since no liquid may be substituted for gasoline or diesel fuel with which the truck will also operate efficiently, the limitation of the metering device to operation upon liquids effectively prevents tampering with the proper functioning of the meter.

This invention provides a complete metering assembly entirely contained within the fuel tank. Its structure is such that it cannot be adjusted without removal from the tank. Not only is this removal a long and arduous task but the fact that such has occurred may be easily detected if simple lead seals are provided on the installation bolts. This invention has the further advantage of meeting all safety requirements for fuel tank installations.

This invention, other than the meter, has only one moving component. This component is operated solely by the pressure produced by the fuel delivery pump. It is so designed that the rate of delivery of the fuel is immaterial to its proper operation.

Since this invention requires an air and liquid tight seal between the delivery nozzle of the fuel pump and the filler neck of the tank, it has been found that special provision must be made for escape of the air displaced from the fuel tank. The air escape passage must be large enough to prevent the build up of a back pressure in the tank. It must also be sealed when the tank is not being filled to prevent spillage in the event of an accident. It must also be so designed that fuel cannot be passed through the meter and then recaptured as it is discharged through the vent. This invention provides an air escape vent meeting each of these requirements.

It has also been discovered that a functionally improved rotor can be created by providing self adjusting shoes for effecting sealing engagement with the walls of the rotor chamber. This arrangement materially reduces manufacturing costs by eliminating the necessity for precise, close tolerance machining. It also eliminates possible functional failure due to binding of the rotor.

These and other objects and purposes of this invention will be immediately seen by those acquainted with equipment of this type upon reading the following specification and the accompanying drawings.

Figure 1:
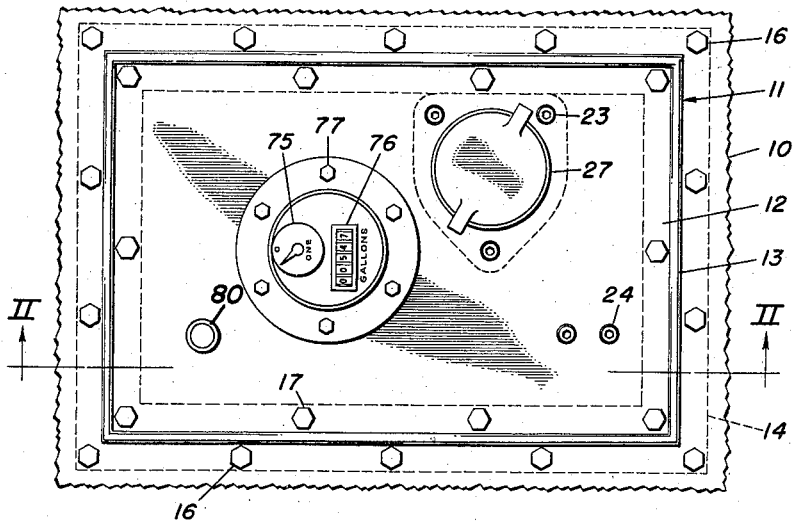
Fig. 1 is a fragmentary plan view of a fuel tank equipped with this invention.

In executing the objects and purposes of this invention, there has been provided a fuel metering assembly of conventional design. This metering assembly is mounted within the fuel tank. Fuel is delivered from a filler neck to the meter through a monitoring assembly. Within the monitoring assembly is a rotor so designed that if liquid is discharged under normal pump pressure against the rotor, the rotor will swing to direct the fuel to the meter. If, however, air under pressure is discharged into the monitoring assembly, the rotor will not swing as it does under the force of a liquid and the air will be discharged into the tank without passing through the meter. The meter is, thus, by-passed and the volume of the air will not be recorded. The invention is so arranged that only a very small quantity of fuel remains in the monitoring assembly at the end of each delivery. This fuel is automatically drained into the tank itself.

A vent is provided surrounding the filler neck for the escape, from the tank, of air displaced by the incoming fuel. This vent is automatically opened by the removal of the filler cap and closed and sealed by the replacement of the filler cap.

Referring specifically to the drawings, the numeral 10 indicates a fuel tank within which there has been cut a normally rectangular opening 11. This opening is closed by a cover plate 12. The cover plate is seated upon a gasket 13 having at its center an upstanding ridge designed to seat snugly between the walls of the opening 11 and the margins of the cover plate 12. The resilient gasket 13 is supported by a backing ring 14. A plurality of nuts may be welded or braised to the under surface of the ring 14 or the ring may have threaded holes to engage bolts. These nuts or threaded holes serve to anchor the mounting bolts 16 which extend through the wall of the tank 10 and the gasket 13 to support the ring 14 and to firmly clamp the gasket 13 between the ring and the inside surface of the tank. The cover plate 12 is in turn secured to the ring 14 and clamped against the gasket 13 by the installation bolts 17.

Figure 2:
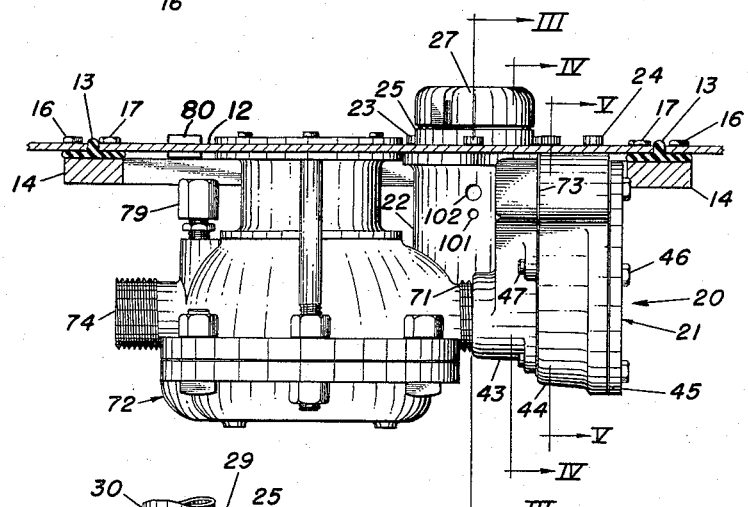
Fig. 2 is a sectional elevation view taken along the plane II—II of Fig. 1.
Figure 3:
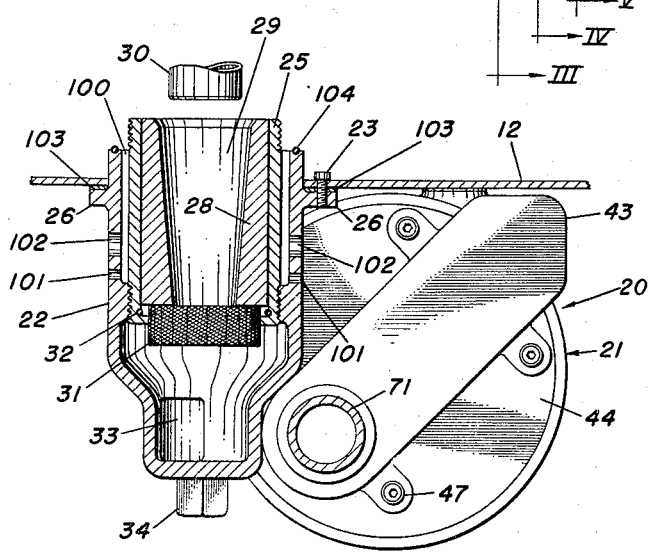
Fig. 3 is a sectional elevation view of the filler neck for this invention taken along the plane III—III of Fig. 2.

Mounted against the undersurface of the cover plate 12 is the monitoring assembly 20 (Fig. 2). The monitoring assembly consists of a housing 21 and a filler tube 22. The filler tube is secured to the cover plate 12 by installation bolts 23 and the housing 21 is secured to the cover plate 12 by the installation bolts 24. As best seen in Fig. 3, the upper portion of the filler tube 22 forms a jacket about the filler neck 25.

The outside diameter of the filler neck 25 is appreciably less than the inside diameter of the filler tube 22, creating an annular passage 100, closed at its lower end where the filler neck 25 is threadedly attached to the filler tube 22.

The lower end of the passage 100 communicates with the inside of the tank through two pairs of vertically spaced ports 101 and 102 (Fig. 3). These ports are arranged in pairs spaced diametrically on the filler tube. The size of the ports 102 is such that their combined capacity will discharge air from the tank at a rate at least equal to the rate at which fuel is introduced into the tank.

Somewhat below its upper end, the filler tube has an outwardly extending flange 26 for receiving the threaded ends of the installation bolts 23. A sealing gasket 103 is seated between the flange 26 and the cover plate 12, insuring a liquid tight seal when the bolts 23 are tightened.

The top surface of the filler tube 22 has a shallow groove for sealing the O-ring seal 104. The seal 104 co-operates with the outer flange of the filler cap 27, sealing the upper end of the passage 100 when the cap is tightened. The cap is secured by the threading on the upper end of the filler neck 25.

Within the filler neck 25 is a resilient throat piece 28 having a frusto-conical internal passageway 29 of decreasing diameter in a downward direction. The throat piece 28 is designed to snugly engage the end of the delivery nozzle 30 of a conventional fuel delivery pump such as is used at service stations. Because of the frusto-conical shape of the passageway 29, various sizes of nozzles 30 may be used with this invention. It is important that a sufficiently tight engagement be made between the throat piece 28 and the nozzle 30 that a liquid tight seal will result. The importance of this feature will appear more fully under "Operation."

At the lower end of the filler neck 25 a conventional screen 31 is mounted below the throat piece 28 by means of a snap ring 32. Fuel entering through the filler neck 25 is discharged into the bottom of the filler tube and passes to the monitoring assembly 20 by means of the passageway 33.

Figure 5:
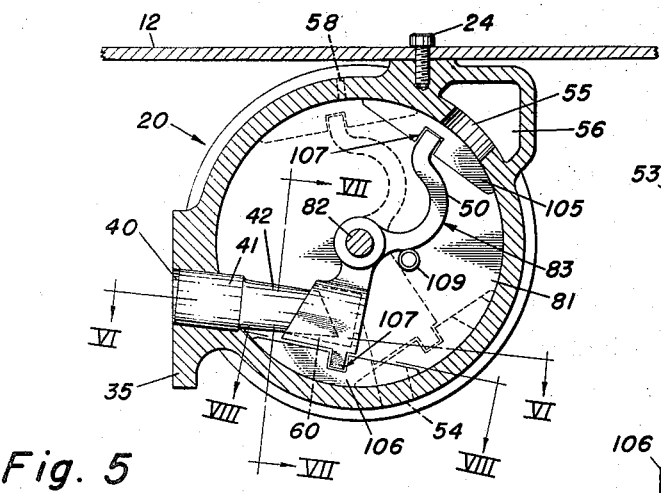
Fig. 5 is a sectional elevation view taken along the plane V—V of Fig. 2 showing the rotor in retracted position.

Preferably, the housing 21 for the monitoring assembly 20 is fabricated separately from the filler tube 22. In this case, a flanged terminus 34 is provided on the filler tube 22. This flanged terminus is designed to abut against the flanged boss 35 of the housing 21 (Figs. 3 and 5). The parts are joined by suitable fasteners such as bolts.

The passageway 33 discharges into the intake passageway 40 of the housing 21. Tightly fitted into the passageway 40 is an inlet nozzle 41. The inner end 42 of the inlet nozzle 41 is of reduced diameter. The importance of this will appear hereinafter.

Figure 4:
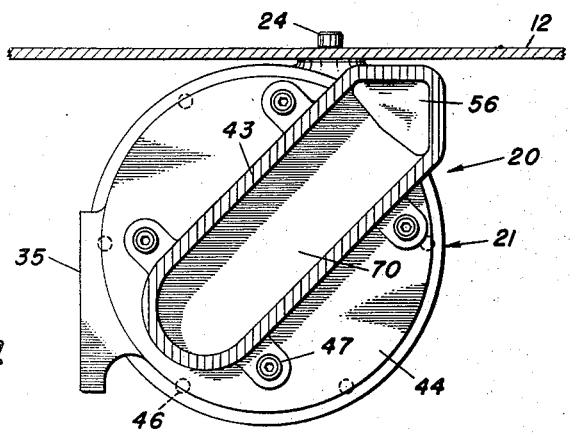
Fig. 4 is a sectional elevation view taken along the plane IV—IV of Fig. 2.

The housing 21 consists of a channel cap 43, a main housing 44 and a cover 45. The cover is secured to the main housing by bolts 46 (Fig. 2). The channel cap is secured to the main housing by bolts 47 (Figs. 2 and 4). The main housing 44 is hollow and contains a circular rotor chamber 81 (Fig. 5). Projecting into this chamber from one wall is a shaft 82 about which is pivotally seated the rotor 83. The rotor is secured to the shaft 82 by means of a washer and cotter pin (not shown).

The rotor has a pair of arms 50 and 51. A floating shoe 105 seats on the end of the arm 50 and a floating shoe 106 seats on the end of the arm 51. The shoes 105 and 106 are the same width as the chamber 81 and have an outside surface curved to seat closely against the outer, circular wall of the chamber. While the shoes may be made of any suitable material, graphite has been found to be a preferable material. Graphite is characterized by lubricity. Thus, the graphite shoes will move easily and smoothly over the inside surface of the chamber 81 even though these surfaces have not been machined to a fine finish.

Each of the floating shoes 105 and 106, approximately at its center, is equipped with a transverse slot 107. Each slot 107 provides a seat for the end of one of the arms of the rotor 83. The shoes are forced to move with the rotor but are not rigidly affixed to it. Thus, they may float or shift radially of the rotor should there be a slight eccentricity between the shaft 82 and the outer wall of the chamber.

Figure 8:
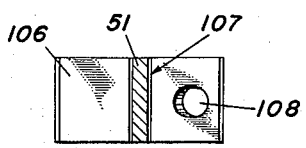
Fig. 8 is a sectional view taken along the plane VIII—VIII of Fig. 5 showing the rotor's lower shoe only.

Adjacent the bottom of the rotor chamber 81 is a drain port 54 opening into the main fuel tank proper. The lower shoe 106 has an aperture 108 (Fig. 8) aligning with the drain port 54 when the rotor is in its retracted position (the position illustrated in solid lines in Fig. 5). The aperture 108, when aligned with the drain port 54, provides free communication between the rotor chamber 81 and the fuel tank. Adjacent the top of the rotor chamber 81 is a discharge port 55 providing communication between the rotor chamber 81 and the outlet channel 56. When the rotor is in its inoperative or retracted position as illustrated in Fig. 5, the outlet port 55 is covered and closed by the shoe 105. The purpose of this will appear more fully under "Operation."

An air vent 58 is provided in the top of the main housing 44, venting the rotor chamber 81 to the interior of the fuel tank when the rotor 83 is in its "at rest" position as illustrated in Fig. 5.

Figure 7:
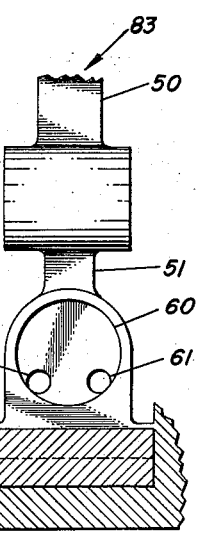
Fig. 7 is an enlarged fragmentary elevation view of the monitoring rotor for this invention taken along the plane VII—VII of Fig. 5 and omitting the inlet nozzle.
Figure 6:
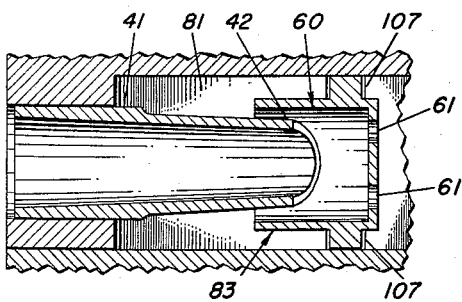
Fig. 6 is a fragmentary sectional view taken along the plane VI—VI of Fig. 5.

The rotor is so designed that it will, by gravity, retract to the position shown in Fig. 5. The lower arm 51 of the rotor has a blind pocket 60, designed to receive the end 42 of the inlet nozzle 41. The size of the pocket 60 is such that its internal diameter is substantially greater than the external diameter of the end 42 of the inlet nozzle. The back or end wall of the pocket 60 is spaced from the end of the inlet nozzle and is entirely closed except for two small orifices 61 (Figs. 5, 6 and 7). The rotor is so mounted that it swings quite freely about the pin or shaft 82.

The upper arm 50 of the rotor has a somewhat U-shaped curve. This tends to shift the center of gravity of the rotor in a manner to increase the tendency of the rotor to return to its retracted position under the influence of gravity. It also provides a suitably positioned contact point for co-operating with the stop 109. This permits a single stop to be employed for limiting both the advanced and retracted positions of the rotor 83.

The outlet channel 56 discharges into the inclined passageway 70 (Fig. 4) of the channel cap 43. At its lower end this passageway communicates with and discharges into the intake port 71 (Fig. 2) of the meter assembly 72. A liquid tight seal is effected between the face of the main housing 44 and the channel cap 43 by the gasket 73 (Fig. 2).

The meter 72 is of conventional construction. For the purposes of this invention it is considered as a purchased assembly. Various types of meters, suitable for use with this invention, are commercially available. Therefore, its internal structure is neither described nor illustrated since it forms no part of this invention. Fuel having passed through the meter and then recorded is discharged into the tank through the discharge port 74.

The volume of fuel passing through the meter is recorded on the dials 75 and 76 (Fig. 1). The meter is secured to the cover plate 12 by the installation bolts 77 passing through the cover in a ring about the dial face of the meter and by a pair of depending studs 78 welded to the under surface of the cover and firmly secured to the lower portion of the meter. Within the fuel tank 10, the meter is provided with an adjustment knob 79 by which the meter may be made to accurately record the quantity of liquid passing through the meter. It is important that this adjustment knob be confined within the tank to make it inaccessible without removal of the entire assembly from the tank.

The cover plate 12 is provided with a conventional air breather port 80. This breather port is equipped with a suitable assembly to prevent the entrance of dirt and moisture and to prevent the escape of fuel in the event the fuel tank is inverted. Such assemblies are of conventional structure and many varied types suitable for

Operation

When the quantity of fuel in the fuel tank 10 is to be replenished, the cap 27 is removed and the nozzle 30 (Fig. 3) of the fuel pump is inserted into the filler neck 25 until a liquid tight seal is formed between the end of the discharge nozzle 30 and the throat piece 28. Today, almost all fuels are delivered by means of a fuel pump capable of delivering fuel in a wide range of flow rates at a substantially uniform, positive pressure. It is the maintenance of this positive pressure which is important to the operation of this invention.

As soon as fuel is discharged by the fuel delivery nozzle 30, the interior of the filler tube 22, the delivery channel 33, the inlet channel 40 and the inlet nozzle 41 are immediately filled with liquid fuel. The small quantity of air trapped in these areas is quickly discharged into the rotor chamber 81 and from there into the tank through the drain port 54 and the vent 58. The displacement of this air will not cause the rotor 83 to swing about the shaft 82. Since the entire path of the fuel from the discharge nozzle 30 to the end of the inlet nozzle 41 is filled with fuel, it is discharged by the inlet nozzle with the same velocity and pressure as it is delivered by the fuel pump.

The rate and velocity with which the fuel is discharged into the pocket 60 is so great that only a minor portion of it is able to escape through the combined capacity of orifices 61 and the annular passageway about the reduced end 42 of the inlet nozzle 41. As a result, the pressure of the fuel pushes against the rotor 83, advancing or swinging it counter-clockwise, as the rotor is illustrated in Fig. 5. In so doing, the shoe 106 moves the aperture 108 away from the drain port 54, closing the drain port. The stop 109 checks the advancing movement of the rotor with an imperforate portion of the shoe 106 seated across the drain port 54, closing it (see rotor as illustrated in phantom in Fig. 5). The upper shoe 105 moves sufficiently to close the vent 58 and open the outlet port 55. So long as fuel is being delivered at normal pump pressure, the rotor will remain stationary in this advanced position.

In its swinging movement, the rotor moves away from the inlet nozzle 41, permitting a free flow of the fuel from the end of the inlet nozzle. The rotor, however, will not advance or pivot further than it is actually forced to do so by the force of the fuel being discharged from the inlet nozzle 41.

With the rotor 83 held in advanced position by the velocity of the incoming fuel, the fuel will freely flow about the rotor 83. The inner portions of the rotor are substantially narrower than the chamber 81 to permit this. The fuel will fill the chamber 81 and flow out through the outlet port 55 and channel 56, down the inclined passageway 70. From the end of the passageway 70 it will be forced through the meter 72. Thus, the fuel will be measured by the meter.

As soon as the discharge of fuel through the nozzle 30 is interrupted, the pressure of the fuel holding the rotor in its advanced, counter-clockwise position will cease and the rotor will retract or return to its normal position (Fig. 5). This opens the vent 58 and the drain port 54, permitting the remaining fuel in the chamber 81 to drain into the tank. The quantity of fuel trapped in the chamber 81 and the various passageways leading from the nozzle 30 to the chamber, is not normally more than a cupful. Therefore, it will not seriously affect the accurate recording of the quantity of fuel by the meter 72. Further, the fact that small quantities of fuel remain at the end of each operation can be carefully computed and added to the readings of the meter. The meter, with this correction, will thus provide an accurate record of the amount of fuel pumped into the tank. Since the meter cannot be adjusted or tampered with from the exterior of the tank, it is impossible to make the meter give a false reading.

To insert the nozzle 30, the cap 27 must be removed. This automatically opens the passage 100. As fuel is pumped through the meter 72 and discharged into the tank through the discharge port 74, the air in the tank displaced by the incoming fuel is vented through the ports 101 and 102 and the passage 100. When the level of the fuel reaches the lower ports 101, it will restrict the free discharge of air resulting in a bubbling in the passage 100. This gives the operator an audible warning that the tank is full. If this warning is ignored, fuel will be forcibly ejected through the passage 100 either before or when the level of the fuel reaches the upper ports 102. This will provide the operator with both an audible and a visual warning.

After the tank is full, the cap 27 is replaced. As it is tightened on the filler neck 25, it seats firmly against the O-ring gasket 104, forming a liquid tight seal. Thus, should the tank be inverted or rolled on its side, the escape of fuel through the passage 100 will be positively prevented.

One method of defrauding truck owners is to pass the fuel into the tank through the meter and then recover excess quantities of fuel forced from the tank through an overflow port or air vent. The shape of the passage 100 prevents this. The annular nature of this passage makes it virtually impossible to attach a pipe or hose to it. Further, the nozzle 30 must be kept firmly engaged with the throat piece 28 to force the fuel through the meter 72 and into the tank.

The monitoring assembly is designed to prevent the use of air under pressure as a means of causing the meter to record when, in fact, no fuel has actually passed through it. Since meters of this type will record the flow of any fluid, the meter is unable to distinguish between liquids and gases if they are passed through the meter in sufficient volume and under sufficient pressure. It is the function of the rotor 83 to prevent air under pressure from reaching the meter.

If air under pressure is introduced into the filler neck 25, its discharge through the inlet nozzle 41 will provide insufficient force against the rotor to pivot it far enough to uncover the outlet port 55 or to fully close the drain port 54 and the vent 58. This is true because the volume of air entering the pocket 60 may readily escape through the combined discharge areas provided by the two orifices 61 and the annular channel existing between the end of the inlet nozzle 41 and the walls of the pocket 60. This effect will not occur with liquids because of their greater viscosity. Although slight movement of the rotor will be effected, it will not be sufficient to permit the air to enter the passageway leading to the meter. This air, accordingly, will be discharged through both the drain port 54 and the vent 58. Thus, it will enter the tank, by-passing the meter and be discharged through the passage 100.

It is seen from this description that the monitoring assembly 20 serves as the means provided between the filler neck 25 and the meter 72 which is capable of sensing the difference between liquids and gases and to pass to the meter only the liquids. It thus serves the purpose of assuring recordation by the meter only of fuel actually delivered into the tank.

While the monitoring assembly 20 is capable of making this distinction, it operates with but a single moving part which itself is operated solely by the force of the liquids passing through it. The simplicity of the assembly is such that its operation is dependable and the likelihood of its break-down is substantially nil.

While I have described a preferred embodiment of my invention, it will be understood that various modifications of this invention may be made, each without departing from the principle thereof. Each of these modifications is to be considered as included in the hereinafter appended claims unless these claims, by their language, expressly state otherwise.

I claim:

1. In means for detecting the difference between liquids and gases discharged under pressure from a nozzle into a fuel tank, said means comprising: a filler neck adapted to make a liquid tight seal with said nozzle; a housing having a vented and generally circular interior chamber; a rotor and means mounting said rotor for free swinging movement within said chamber; said rotor having a pair of arms; a floating shoe mounted on the end of each of said arms; the outer face of each of said shoes being shaped to seat closely against the circular wall of said chamber; said shoes being movable circumferentially of said chamber with said arms as said rotor swings and movable radially of said arms to follow the generally circular wall of said chamber; said rotor in retracted position being displaced from the vent for said chamber; said chamber having a fuel inlet port communicating with said filler neck; said rotor in retracted position having one arm seated adjacent said inlet port and restricting the discharge of fluids therefrom; said rotor in both advanced and retracted positions being biased to pivot said one arm toward said inlet port; said chamber having an outlet port; said outlet port being covered and closed by one of said shoes when said rotor is retracted; said one arm and said inlet port together defining a restricted passage therebetween communicating with said chamber, the area of said passage being sufficient to permit the discharge of gases into said chamber when said rotor is retracted but insufficient to permit the discharge of liquids into said chamber whereby said rotor will be moved by liquids discharged under pressure from said inlet port to advanced position opening said outlet port and closing said vent for said chamber.

2. In means for detecting the difference between liquid and gases discharged under pressure from a nozzle into a fuel tank, said means comprising: a filler neck adapted to make a liquid tight seal with said nozzle; a housing having a generally circular interior chamber; said housing having a vent port and a drain port; a rotor and means mounting said rotor for free swinging movement within said chamber; said rotor having a pair of arms; a floating shoe of graphite mounted on the end of each of said arms; the outer face of each of said shoes being shaped to seat closely against the circular wall of said chamber; said shoes being movable with said arms circumferentially of said chamber as said rotor swings and movable radially of said arms to follow the generally circular wall of said chamber; said rotor in retracted position being displaced from said vent port; the other shoe of said rotor having an aperture therethrough aligned with said drain port when said rotor is retracted; said chamber having a fuel inlet port communicating with said filler neck; said rotor in retracted position having one arm seated adjacent said inlet port and restricting the discharge of fluids therefrom; said rotor in both advanced and retracted positions being biased to pivot said one arm toward said inlet port; said chamber having an outlet port; said outlet port being covered and closed by said one shoe when said rotor is retracted; said one arm and said inlet port together defining a restricted passage therebetween communicating with said chamber, the area of said passage being sufficient to permit the discharge of gases into said chamber when said rotor is retracted but insufficient to permit the discharge of liquids into said chamber whereby said rotor will be moved by liquids discharged under pressure from said inlet port to advanced position opening said outlet port and closing said vent and drain ports.

3. In means for detecting the difference between liquids and gases discharged under pressure from a nozzle into a fuel tank, said means comprising: a filler neck adapted to make a liquid tight seal with said nozzle; said filler neck extending through the wall of said tank; a filler tube surrounding said filler neck and spaced therefrom for defining an annular passage therebetween; said passage communicating with the interior of said fuel tank; a cap detachably secured to said filler neck; said cap having a peripheral portion adapted to make liquid sealing engagement with said filler tube for closing said passage; a housing having a vented and generally circular interior chamber; a rotor and means mounting said rotor for free swinging movement within said chamber; said rotor having a pair of arms; a floating shoe mounted on the end of each of said arms; the outer face of each of said shoes being shaped to seat closely against the circular wall of said chamber; said shoes being movable with said arms circumferentially of said chamber as said rotor swings and movable radially of said arms to follow the generally circular wall of said chamber; said rotor in retracted position being displaced from the vent for said chamber; said chamber having a fuel inlet port communicating with said filler neck; said rotor in retracted position having one arm seated adjacent said inlet port and restricting the discharge of fluids therefrom; said rotor in both advanced and retracted positions being biased to pivot said one arm toward said inlet port; said chamber having an outlet port; said outlet port being covered and closed by one of said shoes when said rotor is retracted; said one arm and said inlet port together defining a restricted passage therebetween communicating with said chamber, the area of said passage being sufficient to permit the discharge of gases into said chamber when said rotor is retracted but insufficient to permit the discharge of liquids into said chamber whereby said rotor will be moved by liquids discharged under pressure from said inlet port to advanced position opening said outlet port and closing said vent for said chamber.

4. In means for detecting the difference between liquids and gases discharged under pressure from a nozzle into a fuel tank, said means comprising: a filler neck passing through one wall of said fuel tank; a housing having a chamber therein; said chamber having a vent and an inlet port communicating with said filler neck and an outlet port; a movable member in said chamber having means for closing said outlet port and restricting said inlet port against the passage of liquids only when said movable member is retracted; said movable member being biased into retracted position; said vent being open when said movable member is retracted; said movable member being movable to advanced position upon discharge under pressure of liquids into said chamber from said inlet port; said movable member in advanced position closing said vent, and being displaced from both said inlet and outlet ports; a filler tube surrounding said filler neck and spaced therefrom for defining an annular passage therebetween; said passage communicating with the interior of said fuel tank; a cap detachably secured to said filler neck; said cap having a peripheral portion adapted to make liquid sealing engagement with said filler tube for closing said passage.

5. In means for detecting the difference between liquids and gases received under pressure, the combination comprising: a housing having a chamber; said housing having a vent port and a drain port communicating with said chamber; a rotor and means mounting said rotor within said chamber for free swinging movement; said rotor in retracted position being displaced from said vent and drain ports; an inlet nozzle projecting into said chamber; said rotor having a blind pocket adapted to receive the end of said inlet nozzle when said rotor is retracted; the cross sectional area of said pocket being greater than the cross sectional area of said inlet nozzle whereby an annular passageway is defined between said inlet nozzle and the walls of said pocket; said rotor in both advanced and retracted positions being biased to move said blind pocket toward said inlet nozzle; said chamber having a discharge port normally closed by said rotor when said rotor is in retracted position; said passageway being of sufficient cross sectional area to permit the discharge of gases entering through said inlet nozzle at a predetermined pressure without advancing said rotor to open said discharge port; said rotor being adapted to advance and open said discharge port and close said drain and vent ports when liquids enter said pocket through said inlet nozzle under said predetermined pressure.

6. In means for detecting the difference between liquids and gases received under pressure, the combination comprising: a housing having a chamber; said housing having a vent port and a drain port communicating with said chamber; a rotor and means mounting said rotor within said chamber for free swinging movement; said rotor in retracted position being displaced from said vent and drain ports; an inlet nozzle projecting into said chamber; said rotor having a blind pocket adapted to receive the discharge end of said nozzle; a restricted orifice in the blind end of said pocket; the cross sectional area of said pocket being greater than the cross sectional area of said inlet nozzle whereby an annular passageway is defined between said inlet nozzle and the walls of said pocket; said rotor in both advanced and retracted positions being biased to move said blind pocket toward said inlet nozzle; said chamber having a discharge port normally covered and closed by said rotor when said rotor is in retracted position; the combined cross sectional areas of said passageway and of said orifice being sufficient to permit the discharge of gases entering through said inlet nozzle at a predetermined pressure without advancing said rotor to open said discharge port; said rotor being adapted to advance and open said discharge port and close said vent and drain ports upon entry of liquids into said pocket from said inlet nozzle under said predetermined pressure.

7. In means for detecting the difference between liquids and gases received under pressure from a nozzle, said means comprising: a housing having a chamber therein; said chamber having a vent, and inlet port and an outlet port; said inlet port adapted to receive liquids under pressure; a movable member in said chamber having means for closing said outlet port and restricting said inlet port against the passage of liquids only when said movable member is retracted; said movable member being biased into retracted position; said vent being open when said movable member is retracted; said movable member being movable by liquids only to advanced position upon discharge from said inlet port of liquids under pressure; said movable member in advanced position closing said vent, and being displaced from both said inlet and outlet ports.

8. In means for detecting the difference between liquids and gases received under pressure from a nozzle, said means comprising: a housing having a circular chamber therein; said chamber having a vent, an inlet port and an outlet port; said inlet port adapted to receive liquids under pressure; a movable rotor in said chamber having means for closing said outlet port and restricting said inlet port against the passage of liquids only when said movable rotor is retracted; said movable rotor being biased into retracted position; said vent being open when said movable rotor is retracted; said movable rotor being movable by liquids only to advanced position upon discharge from said inlet port of liquids under pressure; said movable rotor in advanced position closing said vent, and being displaced from both said inlet and outlet ports.

9. In means for detecting the difference between liquids and gases received under pressure from a nozzle, said means comprising: a housing having a circular chamber therein; said chamber having a vent, an inlet port and an outlet port; said inlet port adapted to receive liquids under pressure; a movable rotor in said chamber having a shoe for closing said outlet port and means for restricting said inlet port against the passage of liquids, said shoe closing said outlet port and said means restricting said inlet port only when said movable rotor is retracted; said movable rotor being biased into retracted position; said vent being open when said movable rotor is retracted; said movable rotor being movable by liquids only to advanced position upon discharge from said inlet port of liquids under pressure; said shoe of said movable rotor in advanced position closing said vent, and being displaced from both said inlet and outlet ports.

10. In means for detecting the difference between liquids and gases received under pressure from a nozzle, said means comprising: a housing having a circular chamber therein; said chamber having a vent, an inlet port and an outlet port; said inlet port adapted to receive liquids under pressure; a movable rotor in said chamber having a shoe for closing said outlet port and means for restricting said inlet port against the passage of liquids, said shoe closing said outlet port and said means restricting said inlet port only when said movable rotor is retracted; said shoe being slidably mounted on said rotor for circumferential movement; said movable rotor being biased into retracted position; said vent being open when said movable rotor is retracted; said movable rotor being movable by liquids only to advanced position upon discharge from said inlet port of liquids under pressure; said shoe of said movable rotor in advanced position closing said vent, and being displaced from both said inlet and outlet ports.

11. In means for detecting the difference between liquids and gases received under pressure from a nozzle, said means comprising: a housing having a circular chamber therein; said chamber having a vent, an inlet port and an outlet port; said inlet port adapted to receive liquids under pressure; a movable rotor in said chamber having a first shoe for closing said outlet port and a second shoe for restricting said inlet port against the passage of liquids, said shoes closing said outlet port and restricting said inlet port only when said movable rotor is retracted; said first and second shoes each being slidably mounted on said rotor for circumferential movement; said movable rotor being biased into retracted position; said vent being open when said movable rotor is retracted; said movable rotor being movable by liquids only to advanced position upon discharge from said inlet port of liquids under pressure; said shoes of said movable rotor in advanced position closing said vent, and being displaced from both said inlet and outlet ports.

12. In means for detecting the difference between liquids and gases received under pressure from a nozzle, said means comprising: a housing having a chamber therein; said chamber having an inlet port and an outlet port; said inlet port adapted to receive liquids under pressure; a movable member in said chamber having means for closing said outlet port and restricting said inlet port against the passage of liquids only when said movable member is retracted; said movable member being biased into retracted position; said movable member being movable by liquids only to advanced position upon discharge from inlet port of liquids under pressure; said movable member in advanced position being displaced from both said inlet and outlet ports.

References Cited in the file of this patent

UNITED STATES PATENTS

| | | |
|---|---|---|
| 2,013,184 | Marden | Sept. 3, 1935 |
| 2,210,676 | Krannak | Aug. 6, 1940 |
| 2,217,655 | Bassett | Oct. 15, 1940 |
| 2,224,345 | Heathman et al. | Dec. 10, 1940 |
| 2,515,202 | Dyer | July 18, 1950 |
| 2,660,350 | Fechheimer | Nov. 24, 1953 |
| 2,668,642 | Johannesen | Feb. 9, 1954 |

FOREIGN PATENTS

| | | |
|---|---|---|
| 570,522 | Germany | Feb. 16, 1933 |